Figure 1:
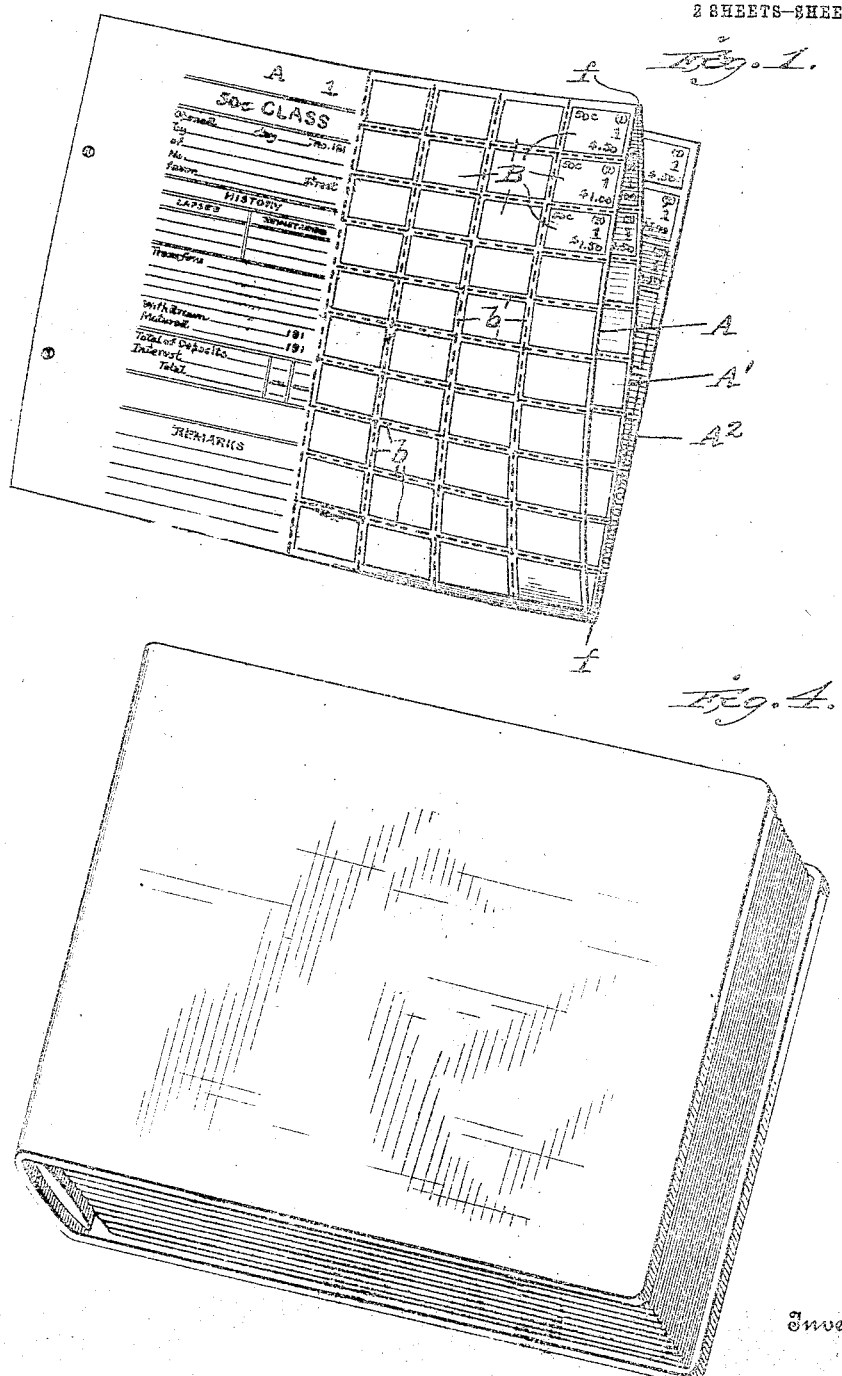

T. N. WINSLOW.
TRIPLE LEAF LEDGER.
APPLICATION FILED APR. 30, 1913.

1,103,554.

Patented July 14, 1914.
2 SHEETS—SHEET 1.

T. N. WINSLOW.
TRIPLE LEAF LEDGER.
APPLICATION FILED APR. 30, 1913.
1,103,554.
Patented July 14, 1914.
2 SHEETS—SHEET 2.
Fig. 2.
Fig. 3.
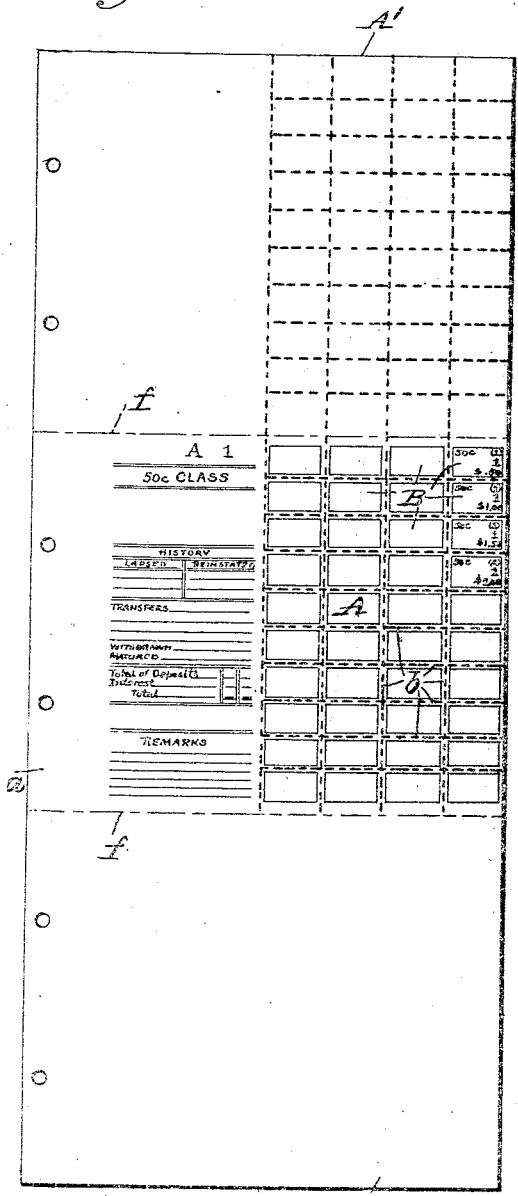
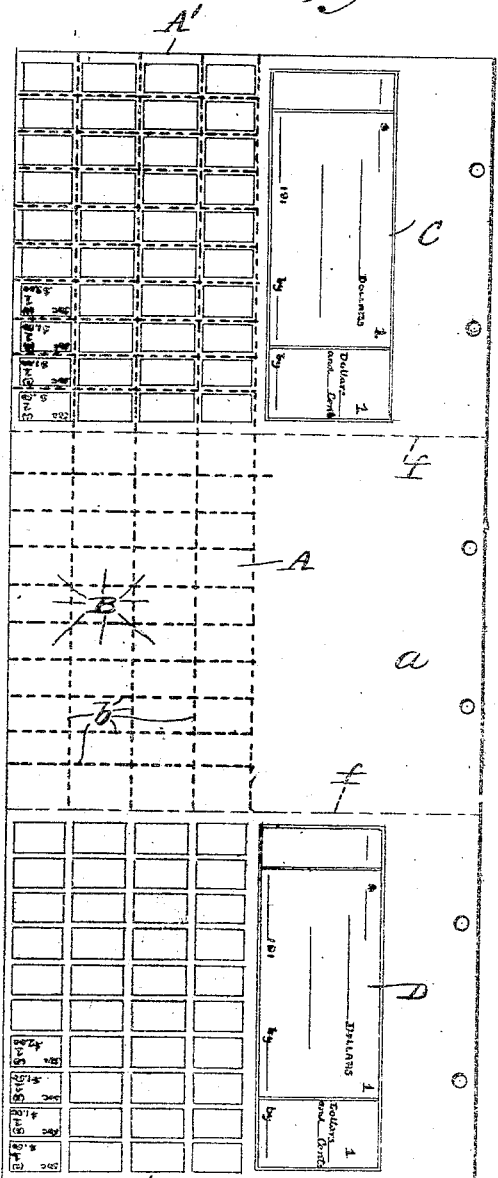

UNITED STATES PATENT OFFICE.

THOMAS N. WINSLOW, OF GREENSBORO, NORTH CAROLINA.

TRIPLE-LEAF LEDGER.

1,103,554.

Specification of Letters Patent.

Patented July 14, 1914.

Application filed April 30, 1913. Serial No. 764,639.

*To all whom it may concern:*

Be it known that I, THOMAS N. WINSLOW, a citizen of the United States, residing at Greensboro, in the county of Guilford and State of North Carolina, have invented a certain new and improved Triple-Leaf Ledger; and I do hereby declare the following to be a full, clear, and exact description of the same, reference being had to the accompanying drawings, forming part of this specification, and to the figures and letters of reference marked thereon.

The present invention has for its object to provide a ledger or record book for keeping certain classes of accounts, such, for example, as the accounts of a savings bank or building association with patrons who make deposits of fixed amounts at periodic intervals, although the invention may be readily adapted for keeping other classes of accounts where the customer is given a receipt and a second duplicate receipt is utilized in the bank or institution itself as a check on the bookkeeper, and hence I do not wish to be limited to the particular use to be hereinafter described.

Referring to the accompanying drawings,—Figure 1 is a perspective view of a triple sheet embodying the present improvements, with the outer edges of the leaves separated somewhat to show their relation. Fig. 2 is a plan of one side of the preferred arrangement of the sheet of paper from which the triple leaves are formed. Fig. 3 is a view of the opposite side of the paper sheet shown in Fig. 2. Fig. 4 is a perspective view of a book in the form of a loose leaf ledger embodying the present improvements.

Like letters of reference in the several figures indicate the same parts.

In accordance with the scheme of the present invention an account kept by an institution with its customer or patron embodies triple leaves in the ledger, each leaf having impressed thereon a series of coupons each corresponding to and indicating an amount of one of a number of periodic payments and the total number of coupons representing the total amount to be paid in completing the transaction of paying in a predetermined sum of money. The coupons are printed on the three leaves so as to overlie and register with each other and lines of weakness or perforations are formed in the two superposed leaves whereby the coupons of these two leaves may be removed singly or in succession leaving the underlying or bottom leaf as a permanent record in the ledger. The coupons of one of the superposed leaves are intended to be handed to the customer or patron as his receipts for the money deposited, while the coupons of the other leaf are to be filed or transmitted by the bookkeeper to the proper offices of the bank or institution as a check upon the transaction and to enable the daily receipts of the institution to be readily determined by the coupons detached from the ledger and transmitted to the proper officer at the close of each day's business. In order that the triple leaves or account sections may be handled successively without liability of accidental detachment of the coupons, it is preferred that the leaves of each account section shall be connected at the top and bottom edges, the third and unperforated leaf always serving as a support for the perforated leaves, whereby the leaves of the whole account section may be readily handled in opening the book to the proper account.

Referring specifically now to the accompanying drawings, the letters A, A', and A², in Fig. 1, indicate the triple leaves which form one account section of a ledger or account book for keeping a record of an account with one patron. The topmost leaf A is provided with a suitable division or stub $a$ on which appears data identifying the account by number, class, the time the account was opened, the person's name, address, the condition of the account at any stated time, transfer, withdrawal, maturity, amount of deposits, interest and a space for remarks applicable to the account. Joining this stub by lines of weakness are a series of coupons B, each separated from the other by lines of weakness $b$ and each having printed thereon data identifying the coupon with the account by number, the amount for which the coupon is a receipt and preferably also the total amount received as indicated by the previously detached coupons. That is to say, the first coupon at the upper right hand corner of the leaf would bear the number of the account, say, No. 1, also the amount represented by that coupon, to wit: fifty cents, and the total amount received, fifty cents. The next coupon below would have the same data, save that the total amount received would be indicated as one dollar, and so on. The second of the triple leaves A', in so far as the coupon portion is concerned, is a duplicate of the coupon portion of the first leaf A and the coupons are adapted to be removed simultaneously with the coupons of the first sheet. The third sheet A², while it is printed to represent a series of coupons, exactly corresponding to the sheets A, and A', is not perforated, but constitutes the permanent record to be left in the ledger. The stub portions of the second and third leaves A' and A² are preferably printed in the form of a certificate of deposit, that on the second leaf A' being shown at C in Fig. 3, and that on the third leaf, at D in the same figure. It is designed that when the coupon receipts are all detached they may be redeemed and a certificate of deposit issued for their face value, and for this purpose the certificate of deposit on the stub of the second leaf A' is detached and given to the patron in return for the coupons, leaving the stub of the first leaf A with a record of the account written thereon and which may be filed away and the complete third leaf A² with a duplicate of the certificate of deposit thereon, and also the coupons which correspond to the coupons detached from the superposed leaves.

It is designed that ledgers shall be made up of triple leaves for different classes of accounts, that is to say, accounts in which different amounts are to be deposited at stated intervals, as for example, a fifty cents class, a one dollar class, a one dollar and fifty cents class, etc., and it is designed that each individual account shall be designated by a different number; thus the triple leaves illustrated in Figs. 1, 2 and 3 are for account No. 1, and this number appears on each leaf and on each coupon so that there can be no possible confusion or lack of identification in the several accounts. Each class may be distinguished by a different tint of paper, so that the facility with which the coupons may be separated and counted and the transactions of a day or of a period determined and checked may be performed in a rapid and easy manner. It is obvious that the triple leaves may be formed of a large sheet of paper folded in various ways, but it is preferred that the folds shall be at the top and bottom edges, as along the dotted lines f in Figs. 2 and 3, and the printing is, of course, arranged on the sections of the large sheet of paper so that the proper faces will be presented, the arrangement of the printing depending upon the particular way in which the sheet is folded, to give the triplicate leaf effect. The preferred way of folding is to have the front and back leaves connected by a fold at the bottom and the front and intermediate leaves connected by a fold at the top, inasmuch as this provides a ready arrangement for permitting the turning of all of the triple leaves of each account by taking hold of the lower edge or of the upper edge of the bottom leaf, which thus forms a support for the perforated leaves and prevents them from being torn or broken.

Obviously, where it is desired to issue the certificates of deposit they must be detached from the other leaves, and hence the stub sections of the leaves may be separated from each other, as, for example, along the stub portions of the dotted lines f and the certificate of deposit may furthermore be provided with lines of weakness to enable it to be drawn away from the binding devices of the ledger without the necessity of opening the ledger for its removal.

In making use of the triple leaf ledger a depositor or patron is furnished with an envelop bearing his account number and the rules and regulations governing the account. This envelop answers for a pass book and is a receptacle for receipts given for deposits. The bookkeeper of the bank enters the name and address of the depositor upon the stub of the appropriate triple leaf, for example, on the stub of the first leaf A and upon the envelop which is given the customer. The bookkeeper then detaches the original and duplicate coupon receipts for the amount of the deposit and hands the original with the envelop to the depositor. The duplicate coupon receipt is filed in the bank or institution and the bookkeeper may stamp the date of the transaction upon the corresponding triplicate coupon receipt on the third page or leaf of the account. Subsequent deposits are handled in the same way, the depositor being always identified by his account number. If a withdrawal is had before the end of the time when the coupons should be redeemed, the account is closed and the permanent record left in the ledger consists of the stubs, the undetached coupons on the first and second leaves and the third or always permanent leaf having duplicates of all the coupons thereon. By noting which of the coupons are exposed on the third leaf in the spaces left by the removed coupons, the amount deposited can always be determined at a glance. If the account is not withdrawn until it matures, the account is closed by removing the stub of the first leaf and issuing a certificate of deposit which is found on the stub of the second leaf. By using a carbon leaf between the second and third leaf stubs when filling in the blank in the certificate an exact duplicate in the banker's own hand writing is preserved in the permanent record. This duplicate certificate of deposit with the account number and other checks, such as the class of account, name of patron and tint of paper used for the account makes counterfeiting exceedingly difficult.

It will be noted that the triple leaf ledger system herein described is particularly adapted to handling savings accounts and avoids entirely the necessity of clerical entries after the account has once been opened, thus doing away with the liability of error in making such entries and at the same time a permanent record is made which is readily checked and the transactions for a given period or day readily determined by simply counting the number of coupons filed for each class of accounts and multiplying the number by the unit of value of the coupon. The sum of the product thus obtained for each class should coincide with the cash received during the period and constitutes a ready and quick check upon any dishonesty or carelessness on the part of the bookkeepers or tellers.

The triple leaf ledger of the present invention does away entirely with the necessity of making bookkeeping entries to complete a customer's account, practically the only entries required being of the data for identification which is entered at the time the account is opened. The bookkeeping is thereafter entirely mechanical and may be performed by persons unskilled and unfamiliar with bookkeeping, as ordinarily understood. The arrangement is such that a positive record is made in that the condition of the account is shown by the third sheet having upon it coupons which are successively disclosed as the customer's coupon and check coupons are removed, and, inasmuch as each of the the coupons of the third sheet is stamped with a dating stamp at the time when the overlying coupons are removed, a complete record is kept mechanically of the character of the transaction and the time of the transaction, and at the same time the customer is provided with a receipt and a check coupon is furnished which may be utilized for giving the sum total of a day's transaction instantly at the close of business. By this system auditing is reduced to the last element of simplicity and opportunity for the falsification of the books is almost eliminated.

Having thus described my invention what I claim as new and desire to secure by Letters Patent of the United States, is:

1. A ledger for recording transactions in deposit accounts, formed of account sections, each section embodying three superposed leaves, the triple leaves of each section all having corresponding successively arranged multiple coupon designations thereon, with corresponding coupon designations of all three leaves superposed one over the other and printed to indicate the same amount involved in a single transaction, the coupons of the two uppermost leaves only being separated from adjacent coupons by lines of weakness between them adapting them for removal to disclose the corresponding coupon of the lower leaf for a permanent ledger record of the transaction of which the removed coupons form the depositors' and auditors' records said leaves having on a non-removable portion appropriately designated spaces for data relating to the complete transaction of which the triple leaves form the current record, i. e., the depositor's name, and identification the depositor's coupons and permanent record leaf having printed thereon like account identifying data.

2. An account ledger for the purpose described formed of account sections each composed of triplicate leaves superposed one upon the other, all of said leaves having stub sections with account identifying data thereon, the stub section of the uppermost sheet having appropriately designated spaces for the data relating to the depositor and special features of the account, the stub sections of the remaining sheets having printed forms thereon for certificates of deposit, and a series of coupons forming the outer portion of each sheet, the coupons on the triplicate leaves overlying and registering one with the other, there being lines of perforations between the coupons of the two uppermost leaves only, whereby said coupons may be detached to disclose the coupons on the lower unperforated leaf of the account section, each coupon of the upper and lower leaves having printed thereon designations of its value and the value of the total deposits including its value there being similar account identifying data on both removable and permanent portions of the leaves.

3. An account ledger for the purpose described, embodying a series of individual account sections bound together at one side edge, each individual account section being composed of triplicate leaves connected at the top and bottom edges by folding the paper of which the leaves are formed, whereby the leaves of each section are connected for being turned as a unit and their outer edges are left separate and said leaves having upon them corresponding successively arranged coupon designations with the corresponding coupon designations of all three leaves superposed in registry with each other, there being lines of weakness between the coupon designations of the two uppermost leaves only, whereby they may be removed for the depositors' and auditors' records and when removed disclose the third sheet coupon designation to form a permanent ledger record there being similar account identifying data on the depositor's coupons and bottom leaf.

THOMAS N. WINSLOW.

Witnesses:
R. G. VAUGHN,
F. H. MILHOLM.